US008805357B2

(12) United States Patent
Raouf

(10) Patent No.: US 8,805,357 B2
(45) Date of Patent: Aug. 12, 2014

(54) MOBILE TELEPHONY MODULE AND METHOD FOR DETERMINING A CELL AS BEING APPROPRIATE

(75) Inventor: Djelal Raouf, Rueil Malmaison (FR)

(73) Assignee: Sagemcom Energy & Telecom SAS, Rueil Malmaison (FR)

( * ) Notice: Subject to any disclaimer, the term of this patent is extended or adjusted under 35 U.S.C. 154(b) by 22 days.

(21) Appl. No.: 13/511,524

(22) PCT Filed: Nov. 19, 2010

(86) PCT No.: PCT/EP2010/067845
§ 371 (c)(1),
(2), (4) Date: May 23, 2012

(87) PCT Pub. No.: WO2011/064150
PCT Pub. Date: Jun. 3, 2011

(65) Prior Publication Data
US 2012/0289223 A1 Nov. 15, 2012

(30) Foreign Application Priority Data
Nov. 24, 2009 (FR) ..................................... 09 58328

(51) Int. Cl.
*H04W 24/00* (2009.01)
(52) U.S. Cl.
USPC ........... 455/425; 455/423; 455/436; 455/437; 370/331; 370/352; 370/356
(58) Field of Classification Search
USPC .................. 455/423–425, 434–442; 370/331, 370/352–356
See application file for complete search history.

(56) References Cited

U.S. PATENT DOCUMENTS

| 6,453,054 | B1 | | 9/2002 | Caesar et al. |
| 6,463,054 | B1 | * | 10/2002 | Mazur et al. ................... 370/352 |
| 6,714,781 | B2 | * | 3/2004 | Pecen et al. ................ 455/426.1 |
| 6,751,472 | B1 | * | 6/2004 | Muhonen .................... 455/553.1 |
| 7,016,342 | B2 | * | 3/2006 | Vaittinen et al. ............... 370/352 |
| 7,633,927 | B2 | * | 12/2009 | Ruohonen et al. ............. 370/350 |
| 8,072,933 | B2 | * | 12/2011 | Marinescu et al. ........... 370/331 |
| 8,285,290 | B2 | * | 10/2012 | Arora et al. .................... 455/438 |
| 8,374,610 | B2 | * | 2/2013 | Hole ............................. 455/436 |

(Continued)

FOREIGN PATENT DOCUMENTS

| WO | WO 00/41425 | 7/2000 |
| WO | WO 02/098071 | 12/2002 |
| WO | WO 2007/144029 | 12/2007 |

OTHER PUBLICATIONS

International Search Report for PCT/EP2010/067845 mailed Jan. 25, 2011.

(Continued)

*Primary Examiner* — Sharad Rampuria
(74) *Attorney, Agent, or Firm* — Nixon & Vanderhye P.C.

(57) ABSTRACT

The invention proposes a GSM communication module that offers the means for the application that controls it to specify to it a set of desired criteria relating to the characteristics of the packet switching service offered by the cell. This set of criteria can be taken into account by the module at various levels. It can take them into account in the initial method for selecting a cell for connecting thereto. It can also take them into account in the method for reselecting a new cell as well in the method for monitoring the neighboring cells.

8 Claims, 4 Drawing Sheets

(56) References Cited

U.S. PATENT DOCUMENTS

| | | | |
|---|---|---|---|
| 8,400,977 B2* | 3/2013 | Ryu | 370/330 |
| 2002/0176409 A1 | 11/2002 | Kivijarvi et al. | |
| 2010/0061337 A1 | 3/2010 | Hallenstal et al. | |
| 2011/0116470 A1* | 5/2011 | Arora et al. | 370/331 |

OTHER PUBLICATIONS

Written Opinion of the International Searching Authority mailed Jan. 25, 2011.

$3^{rd}$ Generation Partnership Project: Functions Related to Mobile Station (MS) in Idle and Group Received Mode; Technical Specification Group GSM/EDGE Radio Access Network; Aug. 1, 2002, 24 pages.

* cited by examiner

MOBILE TELEPHONY MODULE AND METHOD FOR DETERMINING A CELL AS BEING APPROPRIATE

This application is the U.S. national phase of International Application No. PCT/EP2010/067845 filed 19 Nov. 2010 which designated the U.S. and claims priority to FR 09/58328 filed 24 Nov. 2009, the entire contents of each of which are hereby incorporated by reference.

BACKGROUND OF THE INVENTION

1. Field of the Invention

The present invention concerns the field of mobile telephony and more particularly the field of so-called machine-to-machine communication modules. However, it can apply to any wireless telephone communication device.

2. Description of Related Art

Originally, in cellular mobile telephony networks, wireless telephone communication devices consisted of simple handsets for transmitting voice by means of a cellular radio network, the voice being transmitted by a circuit switching surface. Very quickly, the simple transportation of the voice proved insufficient, and the terminals were provided with means for communicating data according to packet switching protocols such as the IP protocol (Internet Protocol defined by RFC 791). These developments gave rise to various generations of communication standards such as GPRS (General Packet Radio Service), EDGE (Enhanced Data Rates for GPRS Evolution), UMTS (Universal Mobile Telecommunications System), and HSUPA (High Speed Uplink Packet Access).

The packet switching service is implemented by the GPRS subsystem, GPRS designating, according to the context, packet mode, or forms of encoding and then modulation (CS1.4, GMSK) of the symbols on the radio channel. EDGE is a form of packet mode that is distinguished from GPRS only through different encodings and modulation (MCS1.9, 8-PSK) of the data on the radio channel; the entire protocol stack on top of the radio channel is identical. Thus, unless indicated to the contrary, GPRS will designate the packet switching service independently of the radio access technology on the basis of GSM.

Whereas GSM networks basically provide the circuit switching service, the packet switching service is for its part dynamic. The network operator can activate it in some cells only, or deactivate it at certain times of the day in order to release resources, in particular radio resources, for the circuit switching service. This functioning is well suited to conventional mobile telephony usage by a human being.

In this context, the GSM standards provide for a selection of the base station to which the mobile connects on the basis of the quality of the circuit switching service. These mechanisms do not take into account availability or the characteristics specific to the packet switching service.

Use is also being made more and more of GSM networks in a so-called machine-to-machine context. In this context, equipment is provided with a GSM communication module that it uses for communicating with other equipment or essential services. The GSM communication module is then managed and controlled by an application rather than by a human user. These applications have given communication requirements that must absolutely be satisfied for correct functioning of the application. Even if some of these applications may use the circuit switching service, it is generally essential for the packet switching service to be operational. In addition, some characteristics of this packet switching service may be necessary for the correction functioning of the application.

In this context, it is detrimental for the mobile communication module of a system to connect to a cell not having available a packet switching service possessing all the characteristics necessary to the application. And this is all the more true if such a cell is available in the environment of the communication module.

BRIEF SUMMARY OF THE INVENTION

The invention aims to solve the above problems by a cell selection method able to take into account one or more criteria relating to the characteristics of the packet switching service offered by the cell. Advantageously, these criteria are also integrated in the method of reselecting a cell when the module is already connected to a first cell.

The use of the method according to the invention ensures that the communication module connects as a priority to the cells offering a packet switching service fulfilling the criteria defined by the application for correct functioning thereof.

The invention concerns a method for determining a cell as being appropriate, by a wireless communication module in a cellular mobile telephony network offering a circuit switching communication service and a packet switching communication service comprising a step of testing the network to which the cell belongs; a step of testing that the cell is not prohibited; a step of testing that the location area is not prohibited; a step of testing the quality of the radio channel, in this case the loss of the radio path, and a step of testing at least one criterion relating to the characteristics of the packet switching service offered by the cell.

According to a particular embodiment of the invention, the packet switching service being GPRS, the method comprises a step of testing the support of a PBCCH channel by this cell.

According to a particular embodiment of the invention, the packet switching service being GPRS, the method comprises a step of testing the EDGE support by the cell.

According to a particular embodiment of the invention, the packet switching service being GPRS, the method comprises a step of testing the operating mode of the network used by the cell.

According to a particular embodiment of the invention, the packet switching service being GPRS, the method comprises a step of testing the CCN notification support by the cell.

The invention also concerns a method for selecting a cell by a wireless communication module in a cellular mobile telephony network offering a circuit switching communication service and a packet switching communication service, characterised in that it comprises a step of excluding cells determined as being inappropriate as indicated above.

According to a particular embodiment of the invention, the method comprises a step of priority selection of the cells determined as being appropriate, as indicated above.

The invention also concerns a method for reselection of a cell by a wireless communication network in a cellular mobile telephony network offering a circuit switching communication service and a packet switching communication service, characterised in that it comprises a step of triggering a cell reselection when the cell ceases to be determined as being appropriate as indicated above.

According to a particular embodiment of the invention, the method comprises a step of testing the quality of the transmission of the RLC control blocks in reception during a transfer in packet switching mode.

The invention also concerns a wireless communication module in a cellular mobile telephony network offering a circuit switching communication service and a packet switching communication service comprising, for determining a cell as being appropriate, means for testing the network to which the cell belongs; means for testing that the cell is not prohibited; means for testing that the location area is not prohibited; means for testing the quality of the radio channel, in this case the loss of the radio path, and means for testing at least one criterion relating to the characteristics of the switching service offered by the cell.

According to a particular embodiment of the invention, the module comprises means for the application that controls it to specify to it a set of criteria relating to the characteristics of the packet switching service.

BRIEF DESCRIPTION OF THE DRAWINGS

The characteristics of the invention mentioned above, as well as others, will emerge more clearly from a reading of the following description of an example embodiment, said description being given in relation to the accompanying drawings, among which

DETAILED DESCRIPTION OF THE INVENTION

The context of machine-to-machine communication corresponds to a context where information processing equipment must communicate with a service without being under the direct control of a user. It may be a case for example of a payment terminal that communicates with the servers of its bank, an automatic train ticket issuing machine, a motor car, an alarm system or a meter such as gas or electricity meters for remote reading.

Figure 1:
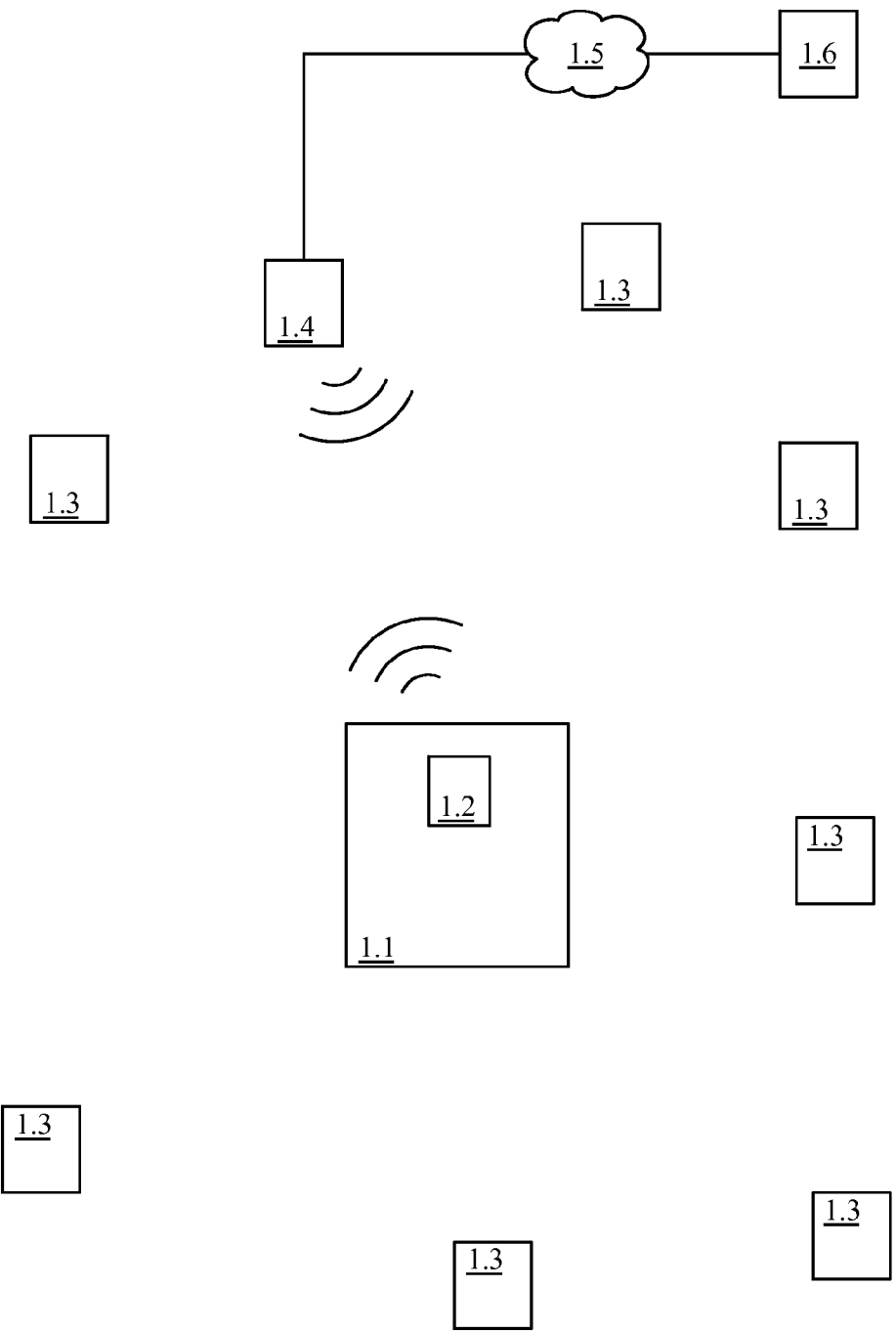
FIG. 1 illustrates the general operating architecture of a machine-to-machine communication.

FIG. 1 illustrates the general operating architecture of a machine-to-machine communication. An item of equipment 1.1 comprises a GSM communication module 1.2. The equipment is surrounded by a set of base stations 1.3, 1.4, accessible by radio. Each of these stations defines a GSM cell. The GSM module 1.2 selects one of these cells and connects for example to the base station 1.4. We assume here that this base station offers a packet switching service, in this case GPRS. This service has available a connection with a packet switching network 1.5, typically internet. The communication module is then able to use this packet switching service for connecting to a distant machine 1.6, itself connected to the communication network 1.5.

The equipment 1.1 typically comprises an information processing device enabling an application to be executed that manages the service for which the equipment was designed. This application has communication needs for which it has recourse to the GSM communication module. These requirements are dependent on each application. This application is called a machine-to-machine application in the remainder of this text. It is therefore it that defines the requirements and manages the communication module.

A machine-to-machine application typically requires data exchanges using the packet switching service, but may also require the conjoint or independent use of the circuit switching service. The majority of existing modules offer the two services, but generally not simultaneously. They are called GPRS class B in the 3GPP document TS 22.060: "General Packet Radio Service (GPRS); Service Description; Stage 1".

The equipment generally communicates with the communication module by a serial link, of the RS-232 or USB type, or even Bluetooth, with standard or proprietary AT commands. The standard used is described in the 3GPP document TS 27.007: "AT command set for User Equipment (UE)".

Each cell in a GSM network transmits on a main frequency, the beacon frequency that is specific to it, information intended for mobile equipment, this is the beacon channel composed of the FCCH channel (Frequency Correction Channel), and the SCH channel (Synchronization Channel). This information comprises a synchronisation code. Specific information is also transmitted over the BCCH channel (Broadcast Control Channel), including the network number, the radio criteria, C1 and C2, for selecting the cell according to the power received, information relating to GPRS if the cell does GPRS, a prohibited-cell indicator and a list of beacon frequencies of neighbouring cells. This information is transmitted in the form of information blocks called SI (System Information).

For cells offering a GPRS packet switching service, some offer a PBCCH channel (Packet Broadcast Control Channel), others not. The presence of a channel is indicated in the information block called SI13 of the BCCH. When such exists, the PBCCH is organised so as to broadcast information, in particular on the presence of supplementary channels enabling the module to be advised of the arrival of a GSM call in circuit switching mode while a communication in packet switching mode is under way. Moreover, new radio criteria are defined such as C31 and C32 in replacement for C2, and the C1 criterion is kept. The information broadcast by the PBCCH are formed, like the BCCH information, in information blocks called PSI (Packet System Information). This information is found in the 3GPP document TS 44.060: "MS-BSS Interface RLC/MAC Protocol".

A cell may offer a GPRS packet switching service without offering a PBCCH channel, but the advantages relating to the information thus broadcast disappear.

The packet switching service is a dynamic service. The network can modify the characteristics of this service at any time, or even omit them. The information broadcast on the BCCH and PBCCH channels is then modified accordingly. These changes are indicated by the positioning of binary flags in these channels, the Change Mark bits.

Access to the services of a GSM network requires a subscription to the network operator. This subscription also fixes the conditions for roaming to the other networks. The necessary information is stored in the SIM card associated with this subscription and used by the module for access to the network.

The use of the services of a network requires selecting a cell to connect thereto. This cell selection method consists of seeking this network on the radio channel and then registering with it. The registration procedure is described in the 3GPP document TS 23.122: "NAS Functions related to Mobile Station (MS) in idle mode" and may be automatic, where the module itself chooses the network according to defined criteria, or manual. In which case the module presents to the user or to the application a list of networks currently available, and then the user or the application has to choose the required network. According to the configuration of the network and module, the registration procedure may concern separately the circuit switching service and the packet switching service, or the two combined. In order to be able to use the packet switching service, in this case GPRS, the module must be "attached" to the GPRS service in the network.

In automatic network selection, the cells detected in the radio environment are first of all sorted by order of priority of their network in accordance with the standard, and then according to the C1 criterion calculated by the module. When the cell is chosen, the module commences with the group the network of which has the highest priority and seeks therein the appropriate cell with the best C1 criterion. If there is no appropriate cell in this group, it passes to the following network group, or otherwise it plants itself on the cell found and launches the registration procedure.

The method of determining a cell as being appropriate is described in the 3GPP document TS 03.2: "Functions related to Mobile Station (MS) in idle mode and group receive mode" paragraph 3.2.1. It comprised the following steps:
- a step of testing the network to which the cell belongs;
- a step of testing that the cell is not prohibited;
- a step of testing that the location are is not prohibited;
- a step of testing the quality of the radio channel, in this case the loss of the radio path.

In manual network selection, the module seeks the networks on the radio channel and displays those that it has found by order of network priority. In the case of a machine-to-machine application dialoguing with the module by AT commands, the display is done by response to the command "AT+COPS=?".

Once the registration has been made with the network, the module checks continuously that it is on the best cell with regard to the radio power received, and that this is still appropriate. If such is no longer the case, and it is in idle mode, that is to say it is not in communication whether by circuit or packet switching, it triggers the cell reselection procedure. The complete list of criteria for triggering a reselection is given in the 3GPP document TS 03.22: "Functions related to Mobile Station (MS) in idle mode and group receive mode", clause 4.5.

Where no cell is appropriate, the module considers that it has lost contact with a network and starts to seek a network again.

When the module is in GPRS transfer, then, in certain network configurations called NCO0 and NCO1 in the standard, the module is autonomous in the reselection of cells, but in other configurations such as NCO2 it changes cell according to the network instructions, which are decided in general on the basis of power measurement and radio quality reports uploaded by the module.

The complete list of beacon frequencies of the neighbouring cells maintained by the module is composed of the list supplied on the beacon channel of the cell to which the module is connected and possibly cells added or removed in the network messages as described in the 3GPP document TS 44.60: "MS-BSS Interface RLC/MAC Protocol". The module regularly measures the average power of the frequencies in this list. When the network so requires, the module sends to it the result of the measurements of the six strongest neighbouring cells. When it is attached to GPRS, unlike the GSM attachment alone, the module has no obligation to decode the information channels of the six strongest neighbouring cells.

The C1 radio criterion is calculated according to the radio powers received and the maximum radio power that can be transmitted according to a formulation described in the 3GPP document TS 45.008: "Radio subsystem link control". It should be noted that this criterion is expressed differently depending on whether an initial cell selection phase or a reselection phase is involved.

In all cases, if C1 is less than or equal to 0, the cell is not appropriate.

In the GPRS protocol stack, just on top of the physical radio layer, the RLC/MAC layer is found, level 2 according to the OSI model. The transmission of information on this RLC/MAC layer takes place by blocks. The RLC control blocks, dedicated to the control of the transmission, and the RLC data blocks, transmitting the application data, are found.

At the physical level, these blocks are transmitted by means of a modulation scheme. It is possible to use several modulation schemes, these being distinguished by the robustness vis-à-vis interference on the radio channel and the bandwidth that they allow. The more robust the modulation scheme adopted, the lower the bandwidth permitted. An adaptation is made continuously in order to choose the best modulation scheme according to the current quality of the radio channel. At any time, the modulation scheme affording the best bandwidth is chosen. However, this choice allocates only the data blocks. So as to ensure good transmission thereof in all cases, these control blocks are always transmitted according to the most robust scheme, called CS1.

The possibility that the module has been advised of a cell on the circuit switching service when it is attached to the packet modulation service depends on the operating mode of the network, called NMO (Network Mode Operation) as described in the 3GPP document TS 23.060: "General Packet Radio Service (GPRS); Service description; Stage 2".

On a network functioning according to the NM01 mode, the module is advised of the arrival of a call on the circuit switching service, whether it be idle or in data transfer on the packet switching circuit.

On a network function according to the NMO3 mode, the module can sometimes miss calls on the circuit switching service even when it is idle.

The NMO is broadcast in SI13 if the cell has no PBCCH and in PSI13 if it has a PBCCH.

Figure 2:
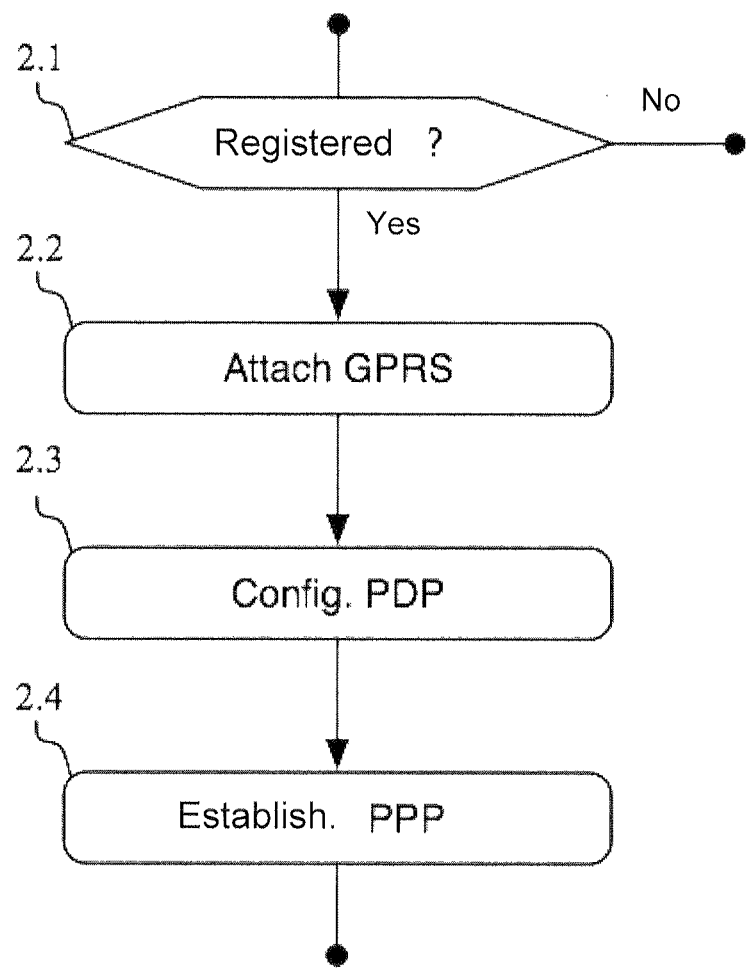
FIG. 2 illustrates an example of connection to a packet switching service.

When the application executed on the equipment needs the packet switching service, it usually proceeds according to the flow diagram in FIG. 2.

During a first step 2.1, it checks that the module is indeed registered on a network. In the contrary case, a network search is initiated. Next, if necessary, it proceeds during a step 2.2 with an attachment of the module to the packet switching service. It then configures the PDP (Packet Data Network) context, which contains the information necessary for the establishment of a communication session, during step 2.3. Next the application establishes a point to point connection, that is to say PPP (Point to Point Protocol), between itself and the module, this being step 2.4. This establishment activates the PDP context. The PPP link supplies an IP (Internet Protocol) address to the application and an IP address to the module. The PDP context is a data item shared between the module and GPRS network. It contains among other things the IP address that the network allocates to the module. The module retransmits this IP address via PPP to the application. This IP address is used in the UDP (User Datagram Protocol) or TCP (Transfer Control Protocol) communications with another application, in principle external to the GPRS network.

In general, GPRS networks deactivate the PDP context after a certain time and sometimes they also force the detachment of GPRS.

If one restricts oneself to the GSM standard, during the initial selection or reselection of an appropriate cell, the availability of the packet switching service is not a cell selection criterion. The module may choose an authorised cell affording the best radio reception but not offering GPRS, even if the application is executed, the equipment requires access to the packet switching service for functioning thereof. Even if the cell selected had the service available, the application may require certain functionalities of the service that would not be available. Nothing in the current standard makes it possible to choose as a priority cells offering a packet switching service the characteristics of which correspond to the expectations of the application.

These expectations may for example comprise the existence of a PBCCH channel, a network operation mode NMO appropriate in the case where the application requires the conjoint use of the packet switching service and the circuit switching service. In addition, it is desirable to enable the module to seek a new ad hoc cell when the cell chosen undergoes a deactivation of its packet switching service by the operator or when the quality of the radio channel become insufficient compared with the requirements of the application.

The recent versions of the 3GPP standard introduce packet handover in order the change cell during a GPRS transfer when the radio quality is too degraded, but few networks and modules are able to implement it. The parameter RXLEV_ACCESS_MIN broadcast by the cell and fixed by the operator may be fixed too low to have a good quality of GPRS reception necessary for the application executed by the TE.

The invention proposes a GSM communication module that offers the means for the application that controls it to specify to it a set of required criteria relating to the characteristics of the packet switching service offered by the cell. This set of criteria may be taken into account by the module at various levels. It may take them into account in the method of initial selection of a cell to which to connect. It may also take them into account with regard to the method of reselecting a new cell as well as in the method for surveillance of neighbouring cells. Advantageously, each of the criteria is broken down into a priority criterion and an exclusion criterion. According to the priority criterion, priority is given to the cells having the said criterion. According to the exclusion criterion, the cells not having the said criteria are excluded from the cell selection or reselection processes. These two types of criterion make it possible to differentiate the desired criteria and the criteria required by the application. Advantageously, each criterion has a default value used when the criterion is not specified by the application.

The use of these supplementary criteria by the module does not involve any modification of the network by the operator since the modules according to the invention function in the context of the existing network.

In the example embodiment of the invention, the means for controlling the various criteria offered by the module consist of an additional specific AT command. The application can use this command to specify the criteria that it wishes to use. Any other communication means may be used according to the communication adopted between the application and the module. In particular, it is possible to modify a module configuration file or to use a particular module programming interface. In all cases, the control means often makes it possible to indicate to the module a list of criteria to be applied for the searching, selection or reselection of cells.

In the example embodiment of the invention, the criteria concern the information supplied from the BCCH or PBCCH channel if such is present. The criteria concern among other things the presence of the PBCCH channel, the EDGE support, the network operating mode (NMO) and the support of the notification CCN_ACTIVE (Cell Congestion Notification). Other criteria may be used.

Concerning the presence of the PBCCH channel, a priority criterion is defined. If this criterion is activated, the cells having a PBCCH channel are favoured during selection or reselection operations. If the criterion is inactive, the presence of a PBCCH channel is not used. In the absence of any indication, by default, the module favours the cells having a PBCCH channel. An exclusion criterion is also defined that makes it possible to exclude the cells not having the support of a PBCCH channel. By default, all the cells are accepted independently of the support of a PBCCH channel.

Concerning the EDGE support, the priority criterion makes it possible to favour the cells offering support thereof. By default, the EDGE support is indifferent. The exclusion criterion makes it possible to reject the cells not supporting EDGE. By default, the cells with EDGE are accepted.

Concerning the network operating mode, a criterion makes it possible to prioritise the various modes. By default the cells operating according to the NMO1 mode have priority over the cells operating according to the NMO2 mode, which themselves have priority over the cells operating according to the NMO3 mode. A criterion makes it possible to exclude the cells not operating according to a mode indicated. By default, all the modes are accepted.

Concerning the support of the congestion notification, a priority criterion makes it possible to favour the cells offering the support of the CCN. By default, the cells not offering the support of the CCN are favoured. A criterion makes it possible to exclude the cells not offering the support of the CCN. By default, the cells not offering the support of the CCN are accepted.

A criterion also makes it possible to modify the power threshold values received concerning the circuit switching service and packet switching service. These thresholds are called APP_RXLEV_ACCESS_MIN and APP_GPRS_RXLEV_ACCESS_MIN in the standard and serve for calculating the C1 criterion participating in the selection policy. Advantageously, these thresholds cannot receive negative values in order to avoid the selection of cells the received power of which is too low. By default these thresholds are fixed at 0.

It may also be advantageous to offer a means for modifying the minimum radio quality threshold for transmitting the RLC control blocks in order to consider GPRS to be functional in the service cell. This parameter is called GPRS_RLC_RXQUAL_MIN, and its default value is 7.

The calculation of radio quality for transmitting the RLC control blocks is made on several RLC blocks. Advantageously, a criterion is offered enabling the application to then modify this number called GPRS_RLC_RXQUAL_NB, which is equal to 104 by default.

The standard specifies, in the 3GPP document TS 03.22: "Functions related to Mobile Station (MS) in idle mode and group receive mode", in paragraph 3.2.1, the concept of "appropriate cell" for defining a cell that can be selected for connection. In the context of the invention, this concept is advantageously extended and an "appropriate cell for GPRS" is defined as being an appropriate cell within the meaning of the standard which, in addition, provides a GPRS service and meets all the exclusion criteria defined above. It is therefore a case of the cells able to be selected according to the standard and that are not excluded by virtue of any of the supplementary criteria described.

Figure 3A:
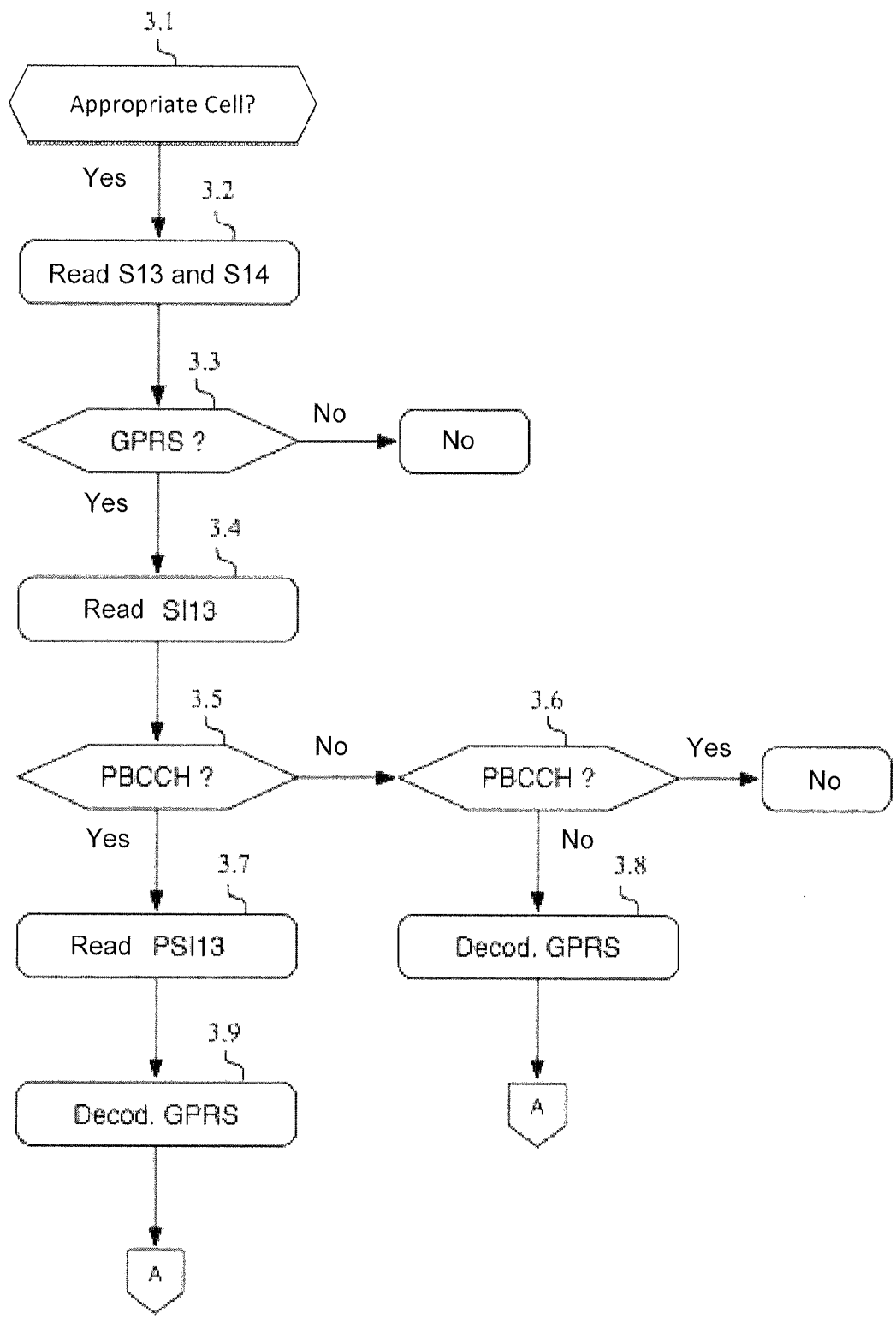
FIG. 3 illustrates the flow diagram for the determination of a cell as being appropriate in an example embodiment of the invention.
Figures 3B, 3C:
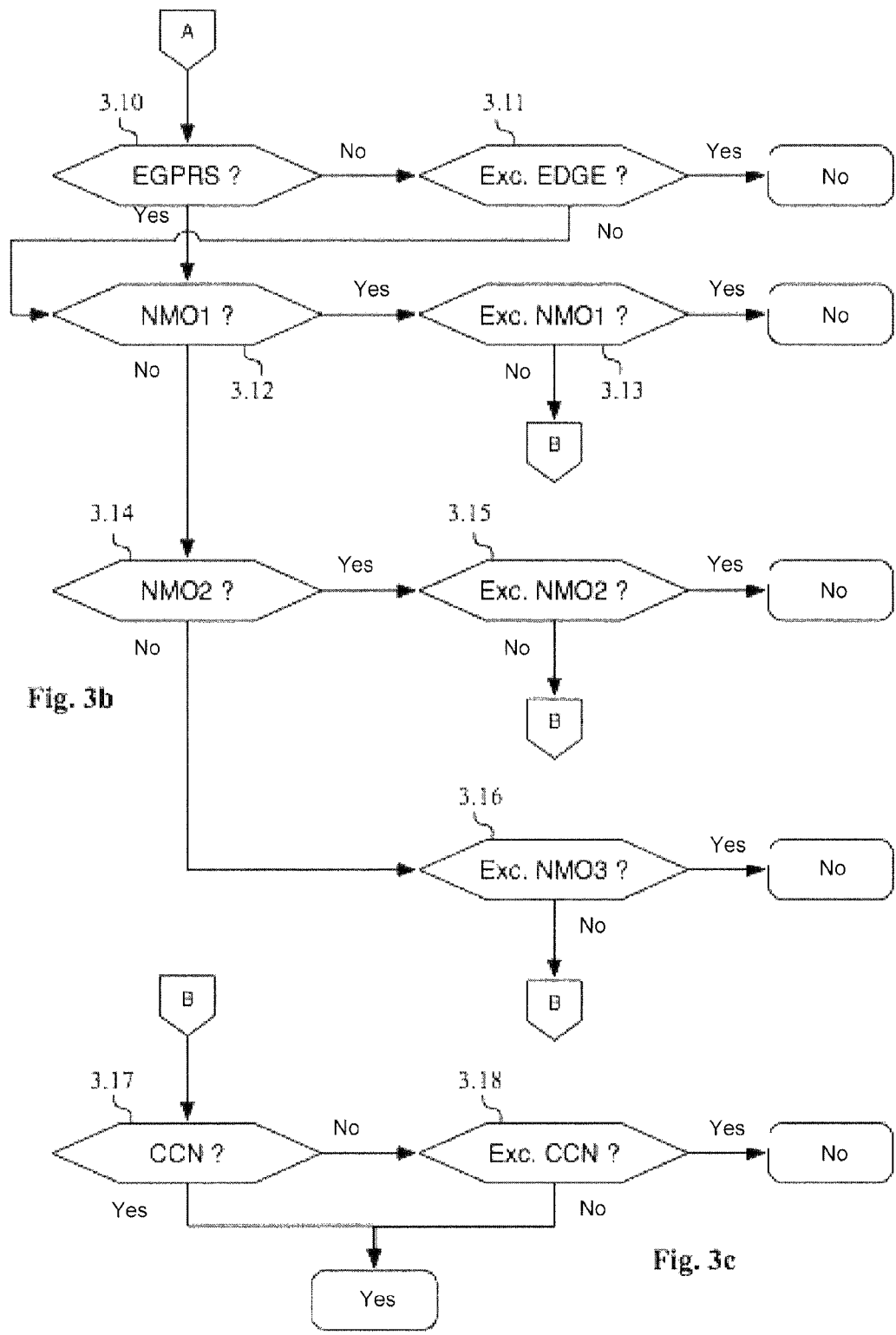

FIG. 3 describes the method of determining such a cell according to the example embodiment of the invention. According to this method, the presence of GPRS, the support of the PBCCH channel, the EDGE support, the network operating mode and the CCN support are determined successively. FIG. 3 is composed of the flow diagrams of FIGS. 3a, 3b and 3c, the labels A and B making the links between the various sub-figures.

When a cell is determined as being appropriate according to the standard, step 3.1, a step of reading the information blocks SI3 and SI4 of the BCCH channel occurs, step 3.2. It is then determined whether GPRS support is indicated by these information blocks, step 3.3. In the negative case, the cell is declared to be inappropriate for GPRS. In the positive case, the block SI13 of the BCCH channel is read, step 3.4. The support of a PBCCH channel is then determined by the cell, step 3.5. In the negative case, it is tested whether the support of the PBCCH channel is an exclusion criterion, step 3.6. In the positive case, the cell is declared inappropriate for GPRS. In the positive case, GPRS information is decoded in the block SI13 of the BCCH channel, step 3.8. If the PBCCH channel is supported, the information block PSI13 is read on the channel, step 3.17, and then GPRS information is decoded in this block, step 3.9. Following these decoding steps, 3.8 and 3.9, FIG. 3*b* is passed to. The EDGE support is then tested, step 3.10. If EDGE is not supported, it is tested whether this support is an exclusion criterion, step 3.11. If such is the case, the cell is declared inappropriate for GPRS. In the case where EDGE is supported or if it is not an exclusion criterion, it is tested whether the cell operates according to the network operating mode NBMO1, step 3.12. If this test is negative, it is tested whether the NMO1 mode is an exclusion criterion, step 3.13. If so, the cell is declared inappropriate for GPRS, and in the contrary case the label B is passed to. If the cell does not operate according to the NM01 mode, the NMO2 mode is tested in the same way, steps 3.14 and 3.15. And if the NMO2 mode is also not the operating mode of the cell, it therefore operates according to the NMO3 mode, the exclusion of which is tested, step 3.16. FIG. 3*c* shows what happens once it is determined that the cell operated according to a non-excluding operating mode. The support of the CCN notification is then tested, step 3.17. If this support is lacking and this support is an exclusion criterion, step 3.18, it is declared that the cell is not appropriate for GPRS. In the contrary case, the CCN notification is supported or is not an exclusion criterion, and the cell is determined as being appropriate for GPRS.

Advantageously, the module includes a step of calculating the quality of the transmission of the RLC control blocks in reception during a transfer in packet switching mode. These blocks are always transmitted according to a so-called robust CS1 modulation scheme and are therefore not subjected to the modulation scheme changes. In the example embodiment of the invention, this quality calculation is the average of the quality measurements over a set of RLC control blocks received. The number of blocks involved being fixed by a parameter, GPRS_RLC_RXQUAL_NB, able to be modified by the application. When there is a change of cell, this calculation is re-initialised. When this quality becomes below a threshold, a cell reselection step is triggered.

At the time of the initial selection of the cell, the standard cell search procedure is adapted for seeking a cell appropriate to GPRS rather than an appropriate cell within the meaning of the standard.

During the phase of seeking cells appropriate for GPRS with a view to selecting the best, the following steps are followed:
during a first step, the cells are sorted according to the priority of the network when cells belonging to several networks are present;
the priority criteria defined by the application are then applied, that is to say the criteria defined above in the document.
finally, the cells are sorted in the subsets thus obtained according to the C1 criterion, potentially modified by the application, in decreasing order of this criterion.

The standard, in the 3GPP document TS 45.008: "Radio subsystem link control" at paragraph 10.1, indicates that a module connected to a cell implements a process of surveillance of the neighbouring cells. This process consists of monitoring the six strongest cells in a list of neighbouring cells. It then uploads to the network its report on measuring the powers received. Advantageously, this process if modified in order to include a step of reading BCCH and possibly PBCCH channels of these cells in order to verify the exclusion criteria described above. The process then includes a step of suppressing the cells that are not appropriate to the GPRS thus determined It also includes a step of inserting so many appropriate cells for GPRS among the strongest subject to availability.

The standard provides, in the 3GPP document TS 03.22: "Functions related to Mobile Station (MS) in idle mode and group receive mode" paragraph 4.5, a set of events triggering a reselection of cells. That is to say, the module being connected to a given cell, if one of these events occurs, the module will seek a new different cell to which to reconnect. Advantageously, a module according to the invention triggers a reselection also on the following events:
if the cell comes within the scope of an exclusion criterion following a modification of the packet switching service by the network, that is to say when the cell ceases to be determined as appropriate for GPRS. This may also be the case when a new exclusion criterion is specified by the application;
if the reception quality measured on the RLC control blocks falls below a threshold fixed by an application.
In all these cases, the module disconnects from the current cell and seeks to select a new cell.

The invention thus described enables the communication requirements of an application to be better taken into account. It applies to any GSM communication used in information processing equipment. It can also be used in a simple mobile telephone, in particular a smartphone able to host applications requiring a communication of the machine-to-machine type.

The invention claimed is:

1. Method for determining a cell as being appropriate, by a wireless communication module in a cellular mobile telephony network offering a circuit switching communication service and a packet switching communication service, comprising the following steps:
a step of testing the network to which the cell belongs;
a step of testing that the cell is not prohibited;
a step of testing that the location area is not prohibited:
a step of testing the quality of the radio channel, in this case a loss of the radio path;
characterised in that it also comprises a step of testing at least one criterion of a set of criteria relating to the support of a functionality by the packet switching service offered by the cell, the set of criteria comprising one criterion relating to GPRS presence, one criterion relating to PBCCH channel support, one criterion relating to EDGE support, one criterion relating to a support of an operating mode of the network to which the cell belongs appropriate for canons requiring the conjoint use of a packet switching communication service and a circuit switching communication service and one criterion relating to CCN notifications support.

2. Method according to claim 1, wherein the wireless communication module being advised of a cell on the circuit switching communication service, when said wireless communication module is attached to the packet switching communication service, in a way depending on the operating mode of the network.

3. Method for selecting or re-selecting a cell by a wireless communication module in a cellular mobile telephony network comprising a plurality of cells, each cell offering a circuit switching communication service and/or a packet switching communication service, characterised in that the wireless communication module connects itself in priority to a cell offering the circuit switching communication service and the packet switching communication service.

4. Method for reselecting a cell according to claim 3, characterised in that it comprises a step of excluding the cells determined as being inappropriate according to claim 1.

5. Method for reselecting a cell according to claim 3, characterised in that it comprises a step of triggering a reselection of cells when the cell ceases to be determined as being appropriate according to claim 1.

6. Reselection method according to claim 5, characterised in that it comprises a step of testing the quality of the transmission of the RLC control blocks in reception during a transfer in packet switching mode.

7. Wireless communication module in a cellular mobile telephony network offering a circuit switching communication service and a packet switching communication service, comprising, for determining a cell as being appropriate, said module being configured for:

testing the network to which the cell belongs;
testing that the cell is not prohibited;
testing that the location area is not prohibited;
testing the quality of the radio channel, in this case the loss of the radio path;
characterised in that it also comprises means configured for testing at least one criterion of a set of criteria relating to the support of a functionality by the packet switching service offered by the cell the set of criteria comprising one criterion relating GPRS presence, one criterion relating to PBCCH channel support, one criterion relating to EDGE support, one criterion relating to a support of an operating mode of the network to which the cell belongs appropriate for applications requiring conjoint use of a packet switching communication service and a circuit switching communication service and one criterion relating to CCN notifications support.

8. Communication module according to claim 7, characterised in that it comprises means for the application that controls it to specify to it a set of criteria relating to the support of a functionality by the packet switching service.

\* \* \* \* \*